United States Patent [19]

Acquanetta

[11] Patent Number: 5,055,977

[45] Date of Patent: Oct. 8, 1991

[54] REMOTE CONTROL ILLUMINATOR

[76] Inventor: Acquanetta, 4415 N. Arcadia La., Phoenix, Ariz. 85018

[21] Appl. No.: 620,771

[22] Filed: Dec. 3, 1990

[51] Int. Cl.[5] .............................................. G01D 11/28

[52] U.S. Cl. .......................................... 362/23; 362/85; 362/109

[58] Field of Search ............................ 362/23, 85, 109

[56] References Cited

U.S. PATENT DOCUMENTS

| | | | |
|---|---|---|---|
| 2,698,895 | 1/1955 | Olson | 362/23 |
| 4,013,882 | 3/1977 | Engler | 362/109 |
| 4,772,986 | 9/1988 | McNemor | 362/23 |
| 4,893,222 | 1/1990 | Mintzer | 362/23 |
| 4,905,127 | 2/1990 | Kaminski | 362/23 |
| 4,949,230 | 8/1990 | Burmeister | 362/85 |

*Primary Examiner*—Carroll B. Dority

*Attorney, Agent, or Firm*—Lowell W. Gresham

[57] ABSTRACT

An apparatus for illuminating the printed markings on a remote control device is disclosed. The apparatus may be configured in a kit form which includes a plate, a light-positioning wing, and a battery compartment integrally formed together into a unit. A remote control device is releasably fastened to an upper surface of the plate. The light-positioning wing extends outward and upward from an edge of the plate to a point above an upper surface of the remote control, then curves back toward the remote control. The light-positioning wing extends a substantial distance along the side of the remote control. Light bulbs are distributed along the concave surface of the light-positioning wing, and a switch is located on the outer or upper surface of the light-positioning wing. When the switch is pressed, light from the light bulbs shines predominantly sideways and slightly downward to illuminate the upper surface of the remote control and the markings printed thereon.

18 Claims, 1 Drawing Sheet

REMOTE CONTROL ILLUMINATOR

TECHNICAL FIELD OF THE INVENTION

The present invention relates generally to lighting devices More specifically, the present invention relates to a lighting apparatus which is specifically adapted to illuminate a remote control device.

BACKGROUND OF THE INVENTION

Remote control devices, hereinafter referred to as remote controls, have achieved widespread use in recent years. Generally speaking, a remote control is a hand-held electronic device that includes the various switches, push buttons, and the like, which are needed to operate or control another item of equipment. Typically, this controlled equipment is remotely located from the remote control. Modern televisions, video cassette recorders (VCRs), stereos, garage door openers, automobile alarms, toys, and the like, are all commonly operated through remote controls While a few remote controls transmit electrical control signals to the controlled equipment via an electrical cable, most modern remote controls transmit electrical control signals to the controlled equipment via an electromagnetic signal. Often this electromagnetic signal is broadcast at a frequency in the infrared portion of the electromagnetic spectrum.

Another feature of modern remote controls is that they give a user the ability to control a vast number of operating parameters of the controlled equipment. This is particularly true of television, VCR, and stereo remote controls. In order to control many parameters, the remote controls include many push buttons. While the inclusion of many push buttons gives a remote control user great flexibility in controlling the controlled equipment, it likewise causes the user to face the problem of selecting the push buttons that are appropriate for achieving a desired result.

In order to help the user select desired push buttons, most remote controls include printed markings, such as phrases, words, abbreviations, acronyms, symbols, and graphical images, located on or near the push buttons. Thus, a user may visually scan the printed markings to identify a desired control function, then press the push button located near the selected marking to implement the function. While this is a generally effective method for selecting a desired push button, it fails when the markings cannot be seen by the user. In some instances, a user may become sufficiently familiar with the physical locations of push buttons so that he or she does not need to see the markings. However, when remote controls include small, closely located push buttons and when a user is not extremely familiar with the physical locations of the push buttons, an inability to see the markings renders the remote control nearly useless.

Moreover, an inability to clearly see markings occurs often in the use of remote controls. Users often operate remote controls for entertainment equipment, such as televisions, VCRs, and stereos, in dim light or darkness because such ambient lighting conditions are often deemed desirable for experiencing the entertainment provided by entertainment equipment. In addition, such entertainment equipment is often used at night when a remote control user's eyes are more likely to be tired and to experience difficulty in focusing.

SUMMARY OF THE INVENTION

Accordingly, it is an advantage of the present invention that an improved lighting apparatus, which is adapted for illuminating a remote control, is provided.

Another advantage of the present invention is that a remote control illuminator which is universally adaptable to a wide variety of remote controls is provided.

Yet another advantage is that the present invention may, but need not, be provided in a kit form which is easily adapted to existing remote controls and which includes its own energy source.

Another advantage is that the present invention evenly illuminates remote control markings while shielding a remote control user's eyes from bright lights.

Still another advantage is that the present invention does not significantly impede the normal utilization of a remote control.

Another advantage is that the present invention is inexpensive to manufacture and purchase.

The above and other advantages of the present invention are carried out in one form by an illumination apparatus for illuminating the push button markings on a remote control. The remote control has a plurality of push buttons, each of which is located near its own corresponding marking. The push buttons are located substantially on an upper surface of the remote control. The apparatus includes a light-positioning wing which physically couples to the remote control so that it extends upward and outward with respect to the remote control. A light-generating component physically couples to the wing at a location that is upward and outward from the remote control. The light-generating component is oriented to shine at least some of its light toward the upper surface of the remote control. An energizing component and a switching component electrically couple to the light-generating component to selectably energize and de-energize the light-generating component.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENTS

Figure 1:
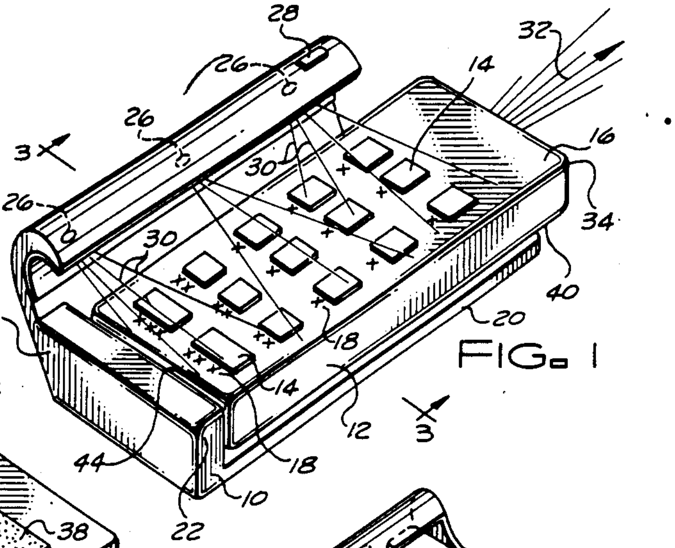
FIG. 1 shows a perspective view of the present invention in a kit form and installed on a remote control.

FIG. 1 shows a first preferred embodiment of the present invention in the form of a kit 10, which is installed on a remote control 12. Remote control 12 includes a multiplicity of push buttons 14, which are located on an upper surface 16 of remote control 12. Those skilled in the art will appreciate that upper surface 16 need not be the uppermost surface on remote control 12. Rather, the surface upon which push buttons 14 reside generally indicates an upward direction for remote control 12. In addition, remote control 12 includes a multiplicity of individual markings 18. Each of markings 18 corresponds to its own one of push buttons 14 and identifies the function performed in response to activating or pressing its corresponding push button 14.

Kit 10 includes a plate 20, a battery compartment 22, a light-positioning wing 24, a light-generating source 26, and a switch 28. When a user (not shown) of remote control 12 activates or presses switch 28, source 26 generates light 30. Light 30 propagates toward upper surface 16 of remote control 12 and illuminates markings 18. The user may then easily see markings 18 and activate a push button 14 corresponding to a selected marking 18.

Remote control 12 represents any one of a multiplicity of conventional remote controls. Such conventional remote controls are commonly used to control a vast assortment of video and audio equipment and are made by a wide assortment of manufacturers. Moreover, remote controls come in a vast assortment of sizes and shapes. Accordingly, while FIG. 1 depicts kit 10 installed on a specific remote control 12, kit 10 is universally adaptable and may alternatively be installed on many different types and styles of remote controls 12.

Although great diversity may be found in the various types and styles of remote controls 12, remote controls 12 also have many features in common. For example, remote controls 12 are typically hand-held devices. Thus, they tend to be relatively thin, and their overall size is limited so that they can be conveniently held by the vast majority of persons who tend to use them. In addition, push buttons 14 and their corresponding markings 18 are generally confined to a single surface of remote control 12, which is designated as being surface 16 herein. Often, push buttons 14 extend above upper surface 16 for a short distance. Remote controls 12 typically transmit or broadcast a signal in a target direction 32 from a target surface 34 of the remote control 12. Target direction 32 and target surface 34 are present even when remote control 12 transmits signals to its controlled equipment (not shown) via electrical cables (not shown). If upper surface 16 is oriented to a roughly horizontal position, then target surface 34 usually represents a generally vertical or at least upright surface of the remote control 12. Usually, remote controls are elongated in the direction of target direction 32. In addition, markings 18 are usually spaced a short distance apart from their corresponding push buttons 14, substantially in target direction 32 or the opposite direction.

Figure 2:
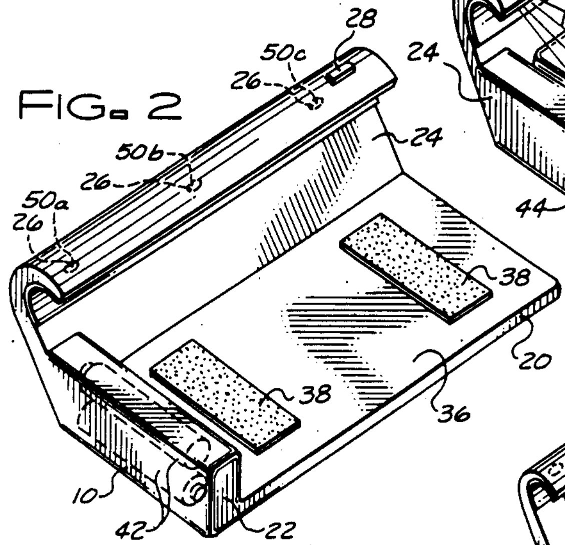
FIG. 2 shows a perspective view of the present invention as shown in FIG. 1 but without the remote control.

FIG. 2 shows kit 10 apart from remote control 12 (see FIG. 1). Kit 10 may be visualized by thinking of a six-sided, frameless rectangular box which has dimensions slightly larger than those of remote control 12. On this six-sided box, at least two, and preferably three, of the six sides are open to permit easy, unobstructed access to remote control 12 and to insure against interference with the normal operation of remote control 12. As shown in FIG. 2, the sides which correspond to upper surface 16 and to target surface 34 of remote control 12 are open. In addition, the preferred embodiment of the present invention shown in FIG. 2 leaves a side which opposes light-positioning wing 24 open.

Plate 20 closes one side of the six-sided box. Plate 20 provides a substantially flat, upper surface 36 to which two or three fasteners 38 are affixed. In the preferred embodiments of the present invention, each of fasteners 38 is an adhesive backed, hook-and-loop fastener, such as the product commonly sold under the tradename Velcro. A first member of each hook-and-loop fastener 38 permanently attaches to upper surface 36, and a second member of each hook-and-loop fastener 38 permanently attaches (not shown) to a back side 40 (see FIG. 1) of remote control 12. As shown in FIG. 1, back side 40 opposes upper surface 16 of remote control 12.

Accordingly, kit 10 releasably attaches to remote control 12. The releasable attachment permits kit 10 to be removed from remote control 12 for installation of batteries in either kit 10 or remote control 12, for replacement of light source 26, for discarding kit 10, or for any other purpose. Fasteners 38 may advantageously be positioned and installed by a user on one or both of kit 10 and remote control 12 at locations which desirably mate a specific remote control 12 with kit 10. In other words, fasteners 38 may be located so that each remote control 12 is positioned at an optimum location on plate 20.

In the embodiment of the present invention shown in FIG. 2, battery compartment 22 closes another side of the six-sided box. Battery compartment 22 is dimensioned to confine at least one battery 42 and to provide electrical contacts (not shown) to terminals of batteries 42. As shown in FIG. 1, battery compartment 22 resides adjacent to an upright surface 44 of remote control 12, and surface 44 resides on the opposite side of remote control 12 from target surface 34. Preferably, battery compartment 22 remains as low in height as possible so that it does not extend above remote control 12 any more than necessary. Those skilled in the art will realize that batteries generally come in a wide variety of types, voltages, and sizes. With appreciation of the battery compartment size consideration, battery compartment 22 may otherwise be dimensioned to accommodate any specific battery or batteries 42.

The inclusion of batteries 42 in kit 10 allows the batteries for light-generating source 26 to be independent from the batteries (not shown) for remote control 12. Hence, excessive operation of light source 26 will not run down the batteries in remote control 12. Remote control 12 continues to function as if kit 10 were not installed even when batteries 42 run down.

Light-positioning wing 24 is preferably integrally formed with battery compartment 22 and plate 20 into a single unit. Wing 24 closes a third side of the above-discussed six-sided box. In the preferred embodiment shown in FIGS. 1–2, wing 24 extends lengthwise, or substantially in target direction 32, for the entire length of kit 10.

Figure 3:
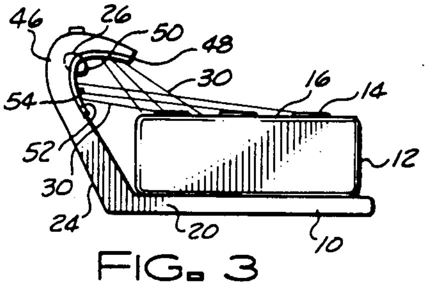
FIG. 3 shows a cross-sectional view of the present invention as shown in FIG. 1, taken across line 3—3.

FIG. 3 shows a cross sectional view of kit 10 and remote control 12, taken at line 3—3 of FIG. 1. As shown in FIG. 3, wing 24 exhibits an arcuate or bow-like shape with a concave side 52 facing remote control 12 and a convex side facing away from remote control 12. Specifically, wing 24 extends upward from plate 20 and outward. In other words, wing 24 extends away from an edge of plate 20 at an obtuse angle to plate 20. Wing 24 extends in this direction until it reaches a point 46 that is slightly above upper surface 16 of remote control 12.

Point 46 is preferably located a vertical distance in the range of 0.75 to 1.50 inches above plate 20. This distance is greater than the thickness of most remote controls 12. In addition, due to the above-discussed obtuse angle, point 46 is spaced a horizontal distance, preferably in the range of 0.25 to 1.0 inches, away from the edge of plate 20 and the base of wing 24. From point 46, wing 24 extends in a generally horizontal direction back toward remote control 12. Preferably, wing 24 terminates at a point 48 that does not overlie any portion of plate 20. Consequently, when kit 10 is installed on remote control 12 as shown in FIG. 3, no portion of wing 24 overlies remote control 12. This allows the open area above remote control 12 to remain as unobstructed as possible.

In the preferred embodiments, light-generating source 26 represents a plurality of small incandescent light bulbs 50*a*, 50*b*, and 50*c*, distributed along the length of wing 24. Light bulbs 50 are mounted on concave side 52 of wing 24 at a point of maximum height above plate 20. In addition, the portion of concave side 52 which resides near light bulbs 50 is formed or coated to provided a mirror-like, light-reflecting surface 54.

As shown in FIG. 3, the portion of wing 24 which extends between points 46 and 48 operates as a shield that blocks direct light produced by bulbs 50 from reaching the eyes of a user of remote control 12. In other words, wing 24 blocks any direct line of sight between bulbs 50 and a users eyes during normal usage of remote control 12. This prevents the user's eyes from being naturally distracted toward bright individual light sources as opposed to upper surface 16 of remote control 12. In addition, light-reflecting surface 54 is preferably configured to reflect substantially all light 30 impinging thereon. Preferably, concave side 52 in cross section forms a parabolic shape with bulbs 50 residing at the focus point of the parabola and the axis of the parabola aimed in the central region of upper surface 16 of remote control 12. Hence, most of light 30 generated thereby is reflected and directed toward upper surface 16.

Referring briefly back to FIG. 1, the use of a plurality of bulbs 50 distributed along the length of wing 24 causes light 30 to be evenly distributed over upper surface 16 and markings 18. Moreover, since light bulbs 50 are spaced only a small distance above push buttons 14 in the preferred embodiments, significant shadows from light 30 may be formed by those push buttons 14 that extend above upper surface 16. As discussed above, markings 18 are usually spaced apart from their corresponding push buttons in substantially target direction 32, or a direction opposite to target direction 32. Since light bulbs 50 are positioned to shine from the side of remote control 12, such shadows tend not to cover markings 18, and markings 18 are satisfactorily illuminated by light 30.

Figure 4:
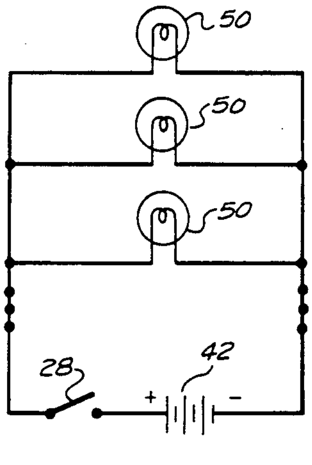
FIG. 4 shows an electrical schematic diagram of the present invention.

FIG. 4 shows a schematic diagram which defines the electrical connections used by the preferred embodiments of the present invention. Specifically, light bulbs 50 are coupled in parallel so that if one bulb 50 burns out, the remaining bulbs 50 will continue to work. The parallel-coupled bulbs 50 couple to a first terminal of battery 42, and through switch 28 to a second terminal of battery 42. Thus, when a user of remote control 12 operates switch 28, bulbs 50 become energized and generate light.

Switch 28 is preferably a momentary switch. Thus, switch 28 closes only when a user of remote control 12 is actively pushing or otherwise manipulating switch 28. This prevents switch 28 from being inadvertently left on and battery 42 from unnecessarily running down.

FIGS. 1-3 depict switch 28 as being located on a forward and upper surface of wing 24. Thus, switch 28 may be easily manipulated by one of a user's hands while simultaneously holding kit 10 (including remote control 12) in that same hand. The user's other hand is free to operate push buttons 14. The lack of obstructions above and to the opposing side of remote control 12 from wing 24 makes the operation of push buttons 14 exceptionally easy.

FIGS. 1-3 further show wing 24 as being located at a left side of plate 20 and remote control 12. While not preventing left-handed users from operating the present invention, this configuration suits to right-handed users. Such users may hold kit 10 (including remote control 12) with the left hand and operate push buttons 14 with the right hand. Of course, those skilled in the art will recognize that wing 24 may alternatively be placed to the right of remote control 12 and plate 20 to optimize kit 10 for left-handed users.

Figure 5:
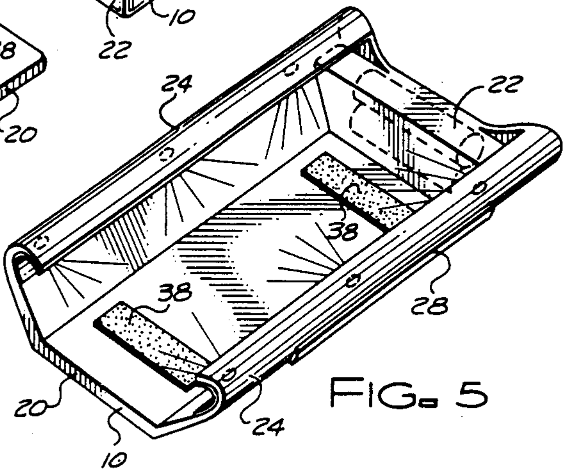
FIG. 5 shows a perspective view of a second embodiment of the present invention.
Figure 6:
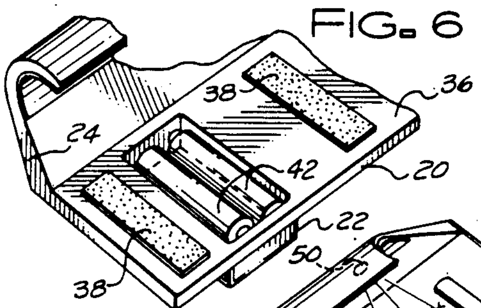
FIG. 6 shows a perspective view of a portion of a third embodiment of the present invention.
Figure 7:
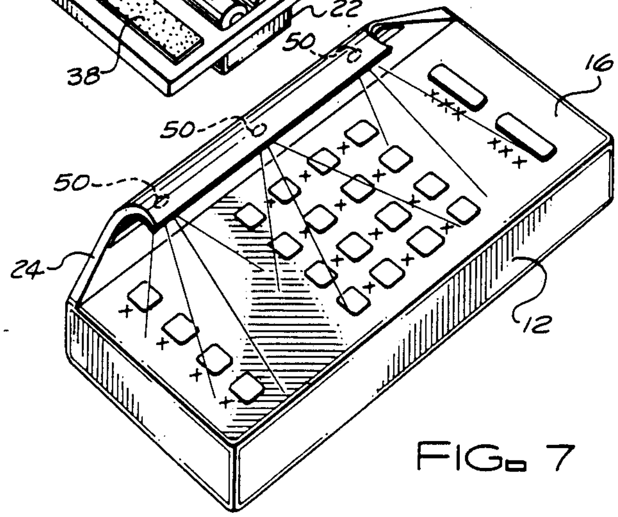
FIG. 7 shows a perspective view of a fourth embodiment of the present invention, wherein the present invention is integrally formed with a remote control rather than being formed as a kit for installation on a remote control.

FIGS. 5-7 show alternate preferred embodiments of the present invention. The embodiment shown in FIG. 5 includes two differences from the embodiment depicted in FIGS. 1-3. First, this embodiment includes wings 24 on both the left and right sides of kit 10. While this embodiment is less preferred than the embodiment shown in FIGS. 1-3, it achieves a benefit in that light shines on upper surface 16 of remote control 12 (see FIG. 1) from two opposing directions. Thus, the light distribution over upper surface 16 is slightly more even. Second, this embodiment modifies switch 28 from its configuration as shown in FIGS. 1-3. As shown in FIG. 5, switch 28 may advantageously be located on the outward side of wing 24. Moreover, switch 28 may advantageously be activated by a large bar-like surface. These modifications to switch 28 make kit 10 more universally adaptable to the existing habits of a multiplicity of users in grasping remote controls.

FIG. 6 illustrates another preferred embodiment of kit 10, in which battery compartment 22 resides underneath upper surface 36 of plate 20. The FIG. 6 embodiment has advantages in adapting to remote controls 12 which have push buttons 14 that are located near surface 44 (see FIG. 1) on upper surface 16 of remote control 12. The FIG. 6 embodiment provides fewer obstructions near surface 40. Hence, markings 18 (see FIG. 1) near such push buttons 14 are easier to observe, and such push buttons 14 are easier to physically access. In addition, this embodiment is easily adaptable to a wide variance in lengths of remote controls 12. Specifically, the FIG. 6 embodiment of kit 10 may be installed on a relatively long remote control 12 so that either, or both of surfaces 34 or 44 (see FIG. 1) extend beyond the end of plate 20 and wing 24. The precise relative position between kit 10 and remote control 12 may be chosen so that push buttons 14 (see FIG. 1) are best illuminated by light-generating source 26.

The kit forms of the present invention are preferably formed primarily from molded plastics. Accordingly, the present invention is inexpensive to manufacture and purchase.

As shown in FIG. 7, the present invention need not be configured as a kit which is installed to an existing remote control 12. Rather, an apparatus may be configured to integrally incorporate both remote control 12 and the present invention as a single unit. In the embodiment shown in FIG. 7 the housing for remote control 12 is shaped to provide wing 24. Moreover, the same batteries (not shown) which operate the normal functions of remote control 12 may also operate light bulbs 50 of the present invention. In addition, FIG. 7 illustrates a light-positioning wing 24 that does not extend the entire length of remote control 12. Rather, wing 24 is positioned parallel to remote control 12 only in the vicinity of push buttons 14. This selective positioning of wing 24 relative to push buttons 14 further clears the area around upper surface 16 of remote control 12 from obstructions.

In summary, the present invention provides an improved apparatus for illuminating a remote control. The present invention may be configured as a kit which adapts to a wide variety of remote controls. The kit includes its own battery which allows lighting energization to be independent from remote control energization. The operation of lighting does not run remote control batteries down. The present invention shields a user's eyes from bright light sources and directs the majority of light produced by such light sources toward markings on a remote control. Accordingly, a user's eyes are naturally drawn precisely to the markings the user wishes to view. Moreover, the present invention adapts to a remote so that the remote control's normal operation is not impeded. The present invention is a simple structure which is inexpensive to manufacture and purchase.

The present invention has been described above with reference to preferred embodiments. However, those skilled in the art will recognize that changes and modifications may be made in these preferred embodiments without departing from the scope of the present invention. For example, those skilled in the art will appreciate that the directional terms used herein, such as upward, horizontal, vertical, upright, left, right, and the like, apply to the orientations depicted in the FIGURES. Of course, the present invention is not limited to any single orientation but may be angled at all sorts of directions relative to the forces exerted by gravity. In addition, the specific materials and dimensions mentioned herein may be altered to meet specific application criteria, and ornamental design features illustrated in the FIGURES may be substantially altered as desired. These and other changes and modifications which ar obvious to those skilled in the art are intended to be included within the scope of the present invention.

What is claimed is:

1. An illumination apparatus for illuminating markings on a remote control device having a plurality of push buttons, each of which is located near its own corresponding marking, said push buttons being located substantially on an upper surface of said remote control, said apparatus comprising:

a light-positioning wing physically coupled to said remote control, said wing extending upward and outward, with respect to said remote control, and said wing having an arcuate cross-sectional shape with a concave side facing toward said remote control and a convex side facing away from said remote control;

means for generating light, said light-generating means being physically coupled to said wing at a location thereon which is upward and outward from said remote control, and said light-generating means being oriented to shine at least a portion of light generated thereby toward said upper surface;

means for energizing said light-generating means, said energizing means being electrically coupled to said light-generating means; and switching means, electrically coupled to said light-generating means and said energizing means, said switching means being for selectably energizing and de-energizing said light-generating means.

2. An illumination apparatus as claimed in claim 1 wherein:

said light-generating means is positioned on said concave side of said light-positioning wing; and said wing is configured so that a portion of said wing blocks a direct line of sight between a user of said remote control and said light-generating means.

3. An illumination apparatus as claimed in claim 1 wherein said concave side of said light-positioning wing has a light-reflecting surface so that a substantial portion of light impinging thereon is reflected toward said upper surface.

4. An illumination apparatus as claimed in claim 1 wherein said light-positioning wing extends upward and outward starting at said remote control, then curves to extend back toward said remote control.

5. An illumination apparatus as claimed in claim 1 wherein:

said remote control is configured to broadcast a signal away from said remote control predominantly in a target direction;

said remote control is elongated substantially in said target direction;

said markings on said remote control are spaced away from their corresponding push buttons substantially in said target direction; and said light-positioning wing physically couples to said remote control so that said wing is elongated to extend substantially in said target direction.

6. An illumination apparatus as claimed in claim 5 wherein said light-generating means comprises a plurality of individual lights spaced apart on said light-positioning wing substantially in said target direction.

7. An illumination apparatus as claimed in claim 1 wherein said switching means comprises a momentary switch configured so that said light-generating means is de-energized unless said momentary switch is then-currently being physically manipulated.

8. An illumination apparatus as claimed in claim 1 additionally comprising a plate physically attached to said light-positioning wing, said energizing means, and said remote control so that said illumination apparatus forms a kit onto which said remote control mounts.

9. An illumination apparatus as claimed in claim 8 additionally comprising fastening means, coupled to said remote control and to said plate, for releasably attaching said remote control to said plate.

10. An illumination apparatus as claimed in claim 9 wherein said fastening means comprises complementary hook and loop engagement strips adhesively affixed to said plate and to said remote control.

11. An illumination apparatus as claimed in claim 8 wherein:

said remote control is configured to broadcast a signal away from said remote control at a first upright surface thereof;

said energizing means comprises at least one battery; and said apparatus additionally comprises a battery compartment, said battery compartment being located on said plate substantially adjacent to a second upright surface of said remote control, said second upright surface opposing said first upright surface.

12. A kit for installation with a remote control exhibiting a thickness, said kit providing selective illumination of markings formed on an upper surface of said remote control, said kit comprising:

a plate having an upper surface and an edge;

a light-positioning wing rigidly attached to said plate proximate said plate edge and extending generally above and outward from said plate, said extension of said wing above said plate being greater than said thickness of said remote control, and said light-positioning wing having an arcuate cross-sectional shape with a concave side facing toward said plate and a convex side facing away from said plate;

light-generating means mounted on said wing at a distance above said plate which is greater than said thickness of said remote control;

a battery compartment attached to at least one of said wing and said plate, said battery compartment being configured to hold at least one battery for energizing said light-generating means; and an electrical switch located on said wing, said switch selectably causing said light to become energized.

13. A kit as claimed in claim 12 wherein:

said light-generating means is positioned on said concave side of said light-positioning wing; and said wing is configured so that a portion of said wing prevents light produced by said light-generating means from propagating upward and outward, relative to said plate, beyond said wing.

14. A kit as claimed in claim 12 wherein said concave side of said light-positioning wing has a light-reflecting surface so that a substantial portion of light impinging thereon is reflected in the direction of said plate.

15. A kit as claimed in claim 12 wherein:

said plate is elongated between first and second ends thereof; and said plate edge traverses said first and second ends.

16. A kit as claimed in claim 12 additionally comprising a fastener located on said upper surface of said plate for securing said remote control to said plate.

17. A kit as claimed in claim 12 wherein:

said plate is elongated between first and second ends; and said battery compartment resides on said upper surface of said plate proximate on of said first and second ends.

18. An apparatus for illuminating markings on a remote control having an elongated shape and a plurality of push buttons, each of which is located near its corresponding marking, said push buttons being located substantially on an upper surface of said remote control, and said apparatus comprising:

a light-positioning wing physically coupled to said remote control, said wing extending upward and outward, with respect to said remote control, said wing being elongated substantially in the direction of elongation for said remote control, and said wing having an arcuate cross-sectional shape with a concave, light-reflecting surface facing said remote control;

means for generating light, said light-generating means being physically located proximate said concave surface of said wing at a location thereon which is upward and outward from said remote control, said light-generating means being oriented to shine at least a portion of light generated thereby toward said upper surface, and said wing being cooperatively configured with said light-generating means so that a portion of said wing blocks a direct line of sight between a user of said remote control and said light-generating means;

means for energizing said light-generating means, said energizing means being electrically coupled to said light-generating means; and a momentary switch electrically coupled to said light-generating means and said energizing means so that said light-generating means is de-energized unless said switch is then concurrently being physically manipulated and so that said light-generating means is energized when said switch is then currently being physically manipulated.

* * * * *

UNITED STATES PATENT AND TRADEMARK OFFICE

CERTIFICATE OF CORRECTION

PATENT NO. : 5,055,977

DATED : October 8, 1991

INVENTOR(S) : Acquanetta

It is certified that error appears in the above-identified patent and that said Letters Patent is hereby corrected as shown below:

In column 1, line 6, insert --.-- after the word devices.

Column 10:

In claim 17, line 9, delete "on" and insert --one--.

In claim 18, line 42, delete "concurrently" and insert --currently--.

Signed and Sealed this

Second Day of March, 1993

*Attest:*

STEPHEN G. KUNIN

*Attesting Officer*

*Acting Commissioner of Patents and Trademarks*